United States Patent [19]

Miner

[11] 4,135,270

[45] Jan. 23, 1979

[54] PORTABLE CARWASH APPARATUS

[75] Inventor: Earl L. Miner, Long Lane, Mo.

[73] Assignee: Detroit Tool & Engineering Co., Lebanon, Mo.

[21] Appl. No.: 773,849

[22] Filed: Mar. 3, 1977

[51] Int. Cl.² ............................................. B60S 3/06
[52] U.S. Cl. ............................... 15/53 A; 15/DIG. 2; 15/50 C
[58] Field of Search .............. 15/DIG. 2, 21 D, 21 E, 15/53 A, 5 AB, 97 B, 98, 50 C

[56] References Cited

U.S. PATENT DOCUMENTS

| | | | |
|---|---|---|---|
| 3,187,359 | 6/1965 | Takeuchi | 15/53 A |
| 3,680,164 | 8/1972 | Thornton-Trump | 15/53 A |
| 3,775,799 | 12/1973 | Talbot | 15/53 A |

FOREIGN PATENT DOCUMENTS

1352066  5/1974  United Kingdom ................ 15/DIG. 2

Primary Examiner—Edward L. Roberts
Attorney, Agent, or Firm—Cohn, Powell & Hind

[57] ABSTRACT

This portable carwash apparatus includes a mobile body carrying a brush support assembly having a forwardly projecting boom carrying the brush, a rearwardly projecting handle and a post, pivotally mounted to the body for swinging movement of the boom and brush by means of the handle between operating positions on either side of the body. A brush drive assembly is mounted to the brush support assembly so that the two assemblies can be lifted from the body as a unit. The body houses a reservoir and a rearwardly disposed power pack and includes spray nozzles on each side for selectively directing cleaning liquid pumped from the reservoir onto the brush. An automatic switching mechanism is provided for the brush drive assembly and pumping assembly so that the brush rotation and spray direction are changed when the brush is moved from one operating position to the other.

14 Claims, 9 Drawing Figures

PORTABLE CARWASH APPARATUS

BACKGROUND OF THE INVENTION

This invention relates generally to carwash apparatus and particularly to a mobile apparatus which can be readily operated by a single operator.

Automatic and manual carwash systems of various types have been well known for many years. In general, the automatic type of apparatus requires either that the vehicle be driven through a wash tunnel or that a self-propelled brush-carrying gantry be moved over a stationary vehicle. Manual systems usually require that the vehicle be driven into a stall provided with a manually operated spray wand. Neither automatic nor manual systems of these types are suitable for washing a large number of stationary vehicles.

Although portable systems for washing vehicles are known, they tend to be divisible into two categories. The first includes apparatus having brushes which are mounted to the end of articulated arms and are intended for washing aircraft and the like. The second includes apparatus having brushes which are mounted on special purpose vehicles such as fork lift trucks and are intended for washing the substantially straight sides of large vehicles. One of the latter type of carwash is disclosed in U.S. Pat. No. 2,253,609 and provides a rearwardly angled boom carried by a vertically telescopic tower. Another apparatus, which is intended for use with regular automobiles, is disclosed in U.S. Pat. No. 3,581,333 and provides a track-mounted machine having a rearwardly angled boom and utilizing a special overhead mopping system. Neither of the above devices is suitable for providing a semiautomatic portable carwash apparatus which could be readily used for washing large numbers of parked vehicles rapidly and inexpensively.

SUMMARY OF THE INVENTION

This portable carwash apparatus provides a means of washing a large number of parked vehicles by a single operator.

The apparatus includes a wheel-mounted body having opposed sides and pivotally mounting a brush support means which can be swung by the operator to operating positions on each side of the body.

The apparatus includes drive means mounted to the brush support means so that the brush, the brush support means and the drive means are removable from the body as a unit to facilitate maintenance and storage.

The brush support means includes a forwardly extending boom, a rearwardly extending handle and a transverse post, pivotally mounting the brush support means to the body.

The drive means includes a reversible electric motor mounted to the post and a flexible drive element housed by the boom and operatively connecting the motor to the brush. A portable power means carried by the body supplies power to the motor.

A reservoir is carried by the body and discharge means supplies liquid from the reservoir to the brush, the discharge means including spray nozzles provided on each side of the body and pump means selectively delivering cleaning liquid from the reservoir, said nozzles directing liquid to the brush from one side of the body, when the brush is disposed on the other side of the body.

The reservoir center of gravity is disposed substantially above the front wheel axis of the body and the power pack is rearwardly located tending to counterbalance the weight of the brush.

The pump means includes a pair of pumps each supplying one set of nozzles and the power means includes switching means actuating one of said pumps and driving the reversible motor in one direction when the brush is in an operating position on one side of the body, and actuating the other of said pumps and driving the motor in the other direction when the brush is in an operating position on the other side of the body.

The switching means includes a pair of oppositely disposed electrical contacts mounted to the brush support means for swinging movement with said support means, and associated oppositely disposed fixed contacts selectively engageable by the movable contacts to supply power to the reversible motor and the pumps.

This portable carwash apparatus provides a particularly effective means of washing the sides and ends of an automobile below window level and can be moved around the vehicle in both a clockwise direction and counterclockwise direction, the body of the apparatus substantially shielding the operator during movement of the apparatus in either direction.

The apparatus is relatively inexpensive to manufacture and can readily be used in conjunction with a hand held brush powered by the same power source and operated by the same operator for washing an entire vehicle.

DESCRIPTION OF THE PREFERRED EMBODIMENT

Figure 1:
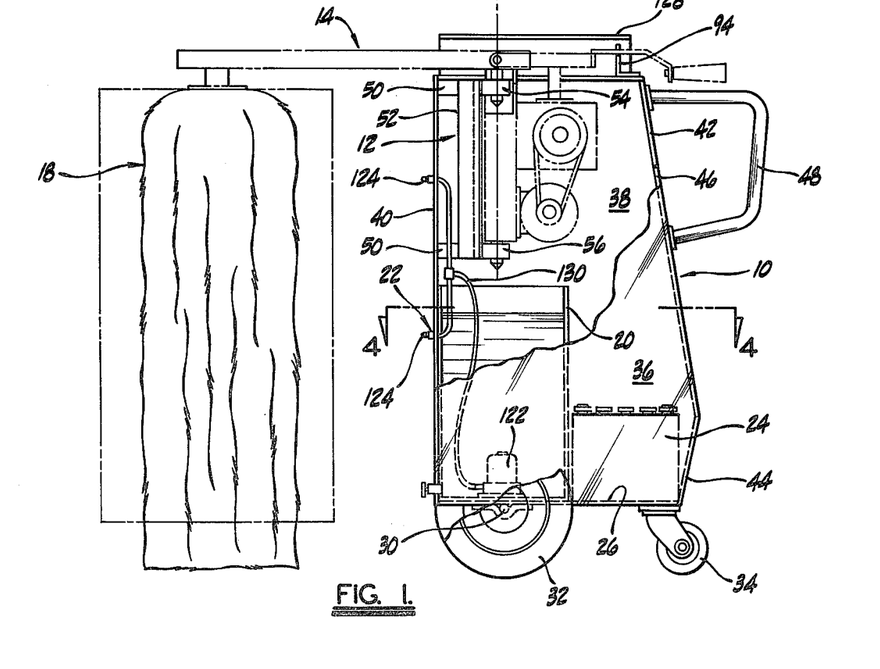
FIG. 1 is a side elevational view of the apparatus, partly in cross section, illustrating the brush support assembly and drive assembly in phantom outline.
Figure 2:
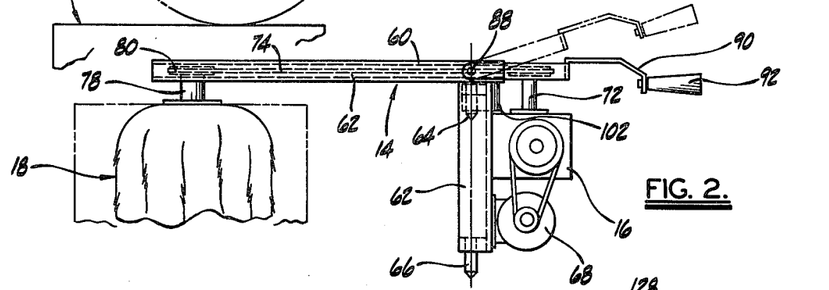
FIG. 2 is a fragmentary side elevational view of the brush support assembly and drive assembly removed as a unit from the body.

Referring now by reference numerals to the drawings and first to FIGS. 1 and 2, it will be understood that the vehicle wash apparatus includes a hollow, wheel mounted body generally indicated by numeral 10 having a mounting frame 12 for receiving a brush support assembly 14 in pivotal relation. The support assembly 14 carries a drive assembly 16 and a rotatable brush assembly 18 and is liftable as a unit from the body 10. The body 10 provides a housing for a reservoir 20 containing cleaning liquid which is supplied to the brush by a pump and spray assembly generally indicated by numeral 22 and constituting discharge means. Power means for the drive and pumping assemblies is provided by a pair of six volt batteries 24. The brush assembly 18 can be moved from one side of the body 10 to the other, as shown in FIG. 3 in phantom outline, by virtue of the support assembly 14 and the components of the wash apparatus will now be described with greater particularity and with additional reference to FIGS. 5-7.

The body 10 includes a floor 26 to which is mounted an axle 30, carrying a pair of forward ground wheels 32, and a pair of rear casters 34. The body also includes left and right side walls 36 and 38 interconnected by a front wall 40 and upper and lower rear wall portions 42 and 44 together with edge portions 46 to which push handles 48 are attached as by fasteners. The mounting frame 12 to which the support assembly 14 is pivotally attached consists essentially of upper and lower cross members 50 attached to the front wall 40 as by fasteners and interconnected by a vertical angle member 52 as by welding. Angle member 52 is provided with upper and lower apertured bearing members 54 and 56 fixedly attached thereto as by welding.

Figure 3:
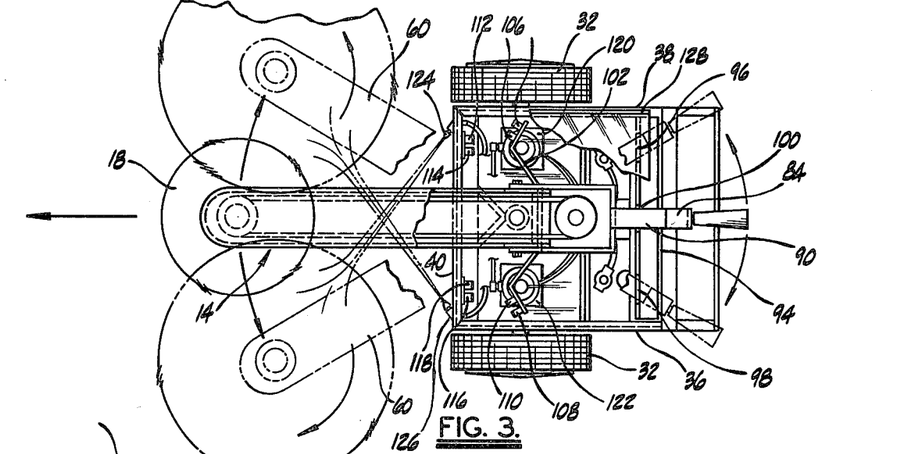
FIG. 3 is a plan view of the apparatus illustrating the two operating positions of the brush in phantom outline.
Figure 7:
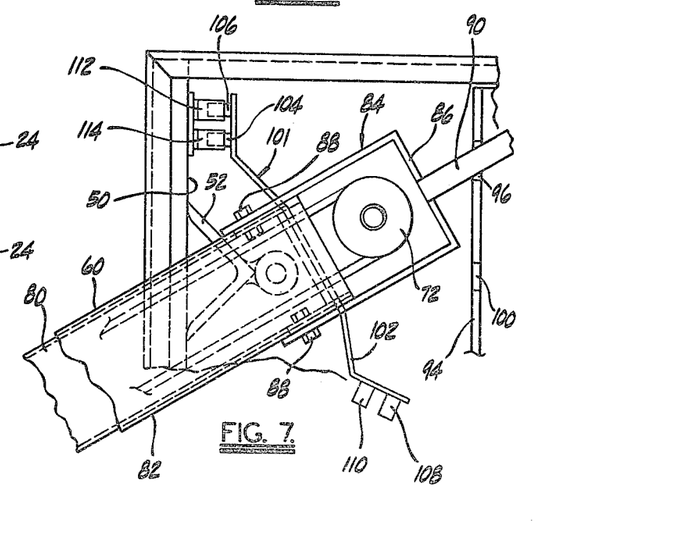
FIG. 7 is an enlarged fragmentary detail illustrating the switching mechanism.

The brush support assembly 14, as shown in FIGS. 2 and 3 consists essentially of a substantially rectangular boom 60 and a channel-shaped post 62 rigidly attached thereto as by welding. The post is provided with upper and lower pintle members 64 and 66 respectively which are rigidly attached to the boom 60 and post 62 respectively, as by welding, and are received by associated apertured bearing members 54 and 56 in journal relation. The support assembly 14 carries the drive assembly 16, which includes a reversible electric motor 68 and a belt-connected transmission unit 70 which are attached to the post 62 as by fasteners. The transmission unit includes a vertical, sprocketed shaft 72, which is connected to the brush assembly by means of an endless chain 74 constituting a flexible drive element. The brush assembly 18 includes a bearing sleeve 78 having a sprocketed brush shaft 80 journal mounted therewithin to receive the endless chain 74. As best shown in FIG. 7 the boom 60 which is formed from a lower channel-shaped member 80 and an upper cover 82 is provided at its rear end with a handle assembly generally indicated by numeral 84. The handle assembly 84 includes a U-shaped member 86 pivotally attached to the boom 60 by fasteners 88. A rearwardly projecting locking arm 90 is rigidly attached to the U-shaped member 86 and terminates in a hand grip 92 (FIG. 2).

Figure 5:
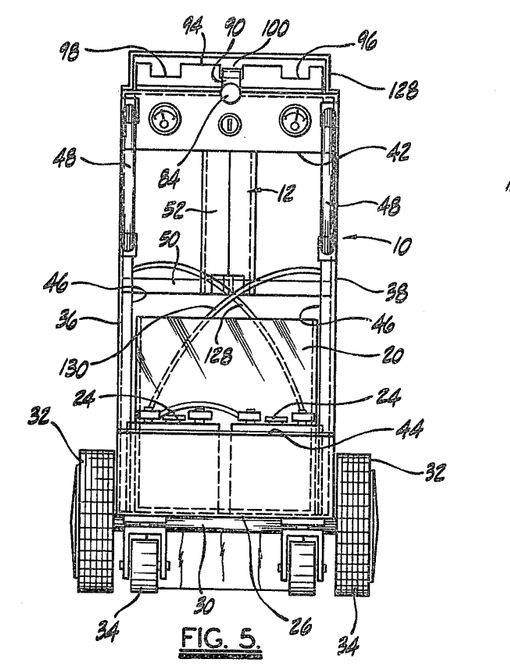
FIG. 5 is a rear end view of the apparatus.
Figure 6:
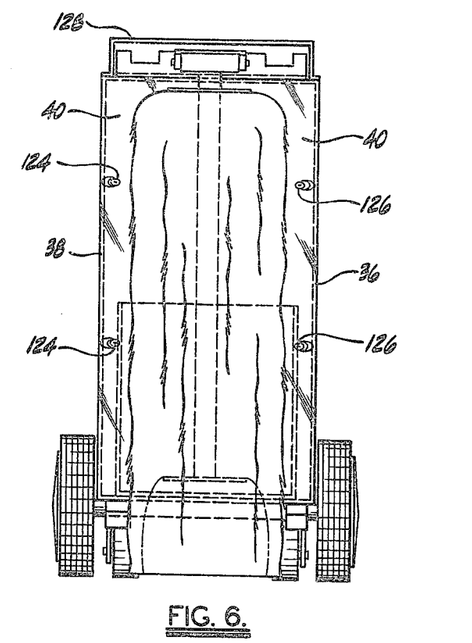
FIG. 6 is a front end view of the apparatus.

Importantly, the handle assembly 84, see FIG. 3, provides a means whereby the brush support assembly 14 can be locked in its limit positions at each side of the body 10, and also its neutral position. More specifically, as shown in FIG. 5, the locking is effectuated by means of a notched member 94 which extends transversely across the top of the body 10 and is provided with side notches 96 and 98 and a center notch 100. Because of the upward and downward movement capability of the handle assembly 84 provided by the pivotal connection to the boom 60, the locking bar 90 may be moved into and out of engagement with the notches. The locking bar 90 provides a means whereby the boom 60 may be locked in the left hand, right hand or neutral position respectively, it being understood that the neutral position provides that the boom is longitudinally aligned with the direction of travel in a nonoperative position. When the boom 60 is swung into its operative offset positions by the handle assembly, a positive switching mechanism 101, which will now be described, automatically conditions the circuitry of the reversible motor 68 and the pump and spray assembly 22 for operation.

Figure 8:
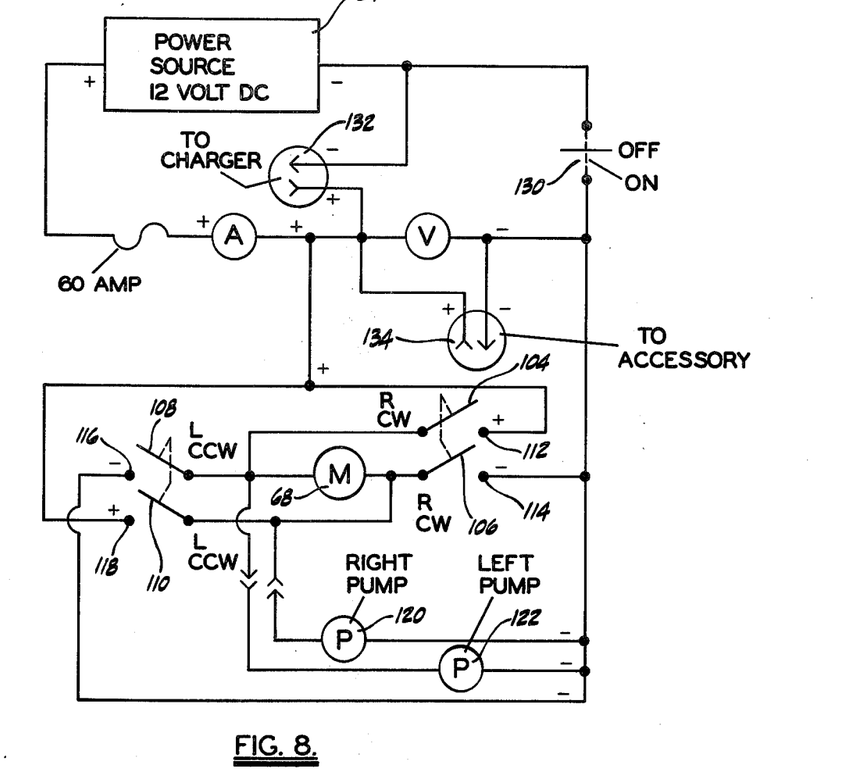
FIG. 8 is a schematic illustrating the electric circuitry.

The switching mechanism 101 is best understood by reference to FIGS. 3, 7 and 8 and is provided, in the preferred embodiment, by means of a strut 102 fixedly attached to the post member 62, as by welding, said strut 102 having movable knife switch contacts 104 and 106 at the right end and movable knife switch contacts 108 and 110 at the left end. Fixed cooperating contacts 112, 114 and 116, 118 are provided on the upper cross frame member 50 at the right and left side respectively which are engageable by said movable contacts. It will be understood that the arcuate travel of the contacts 104 and 106, which is caused when the support assembly boom rotates, for example, in a counterclockwise direction, results in engagement of these contacts with the associated cooperating contacts 112 and 114 as best shown in FIG. 7.

Figure 4:
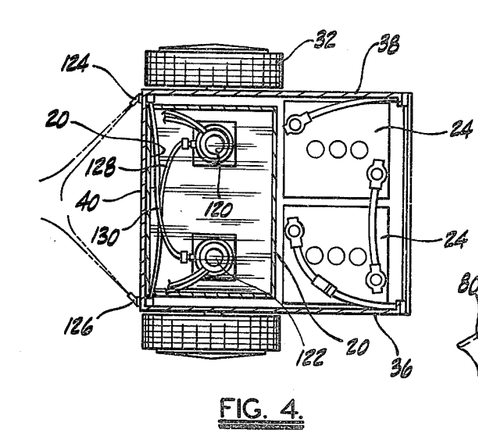
FIG. 4 is a sectional plan view taken on line 4—4 of FIG. 1.
Figure 9:
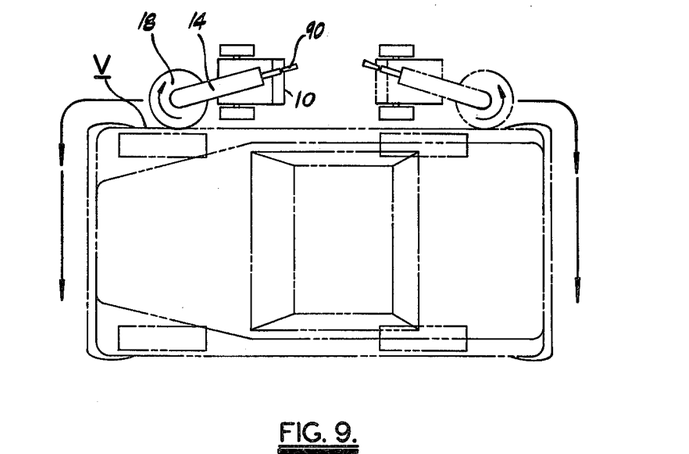
FIG. 9 is a schematic illustrating the use of the apparatus.

The electrical circuitry is shown in FIG. 8 and it will be readily understood that the closing of contacts 104 and 106, which are ganged together, results in the rotation of the reversible motor 68 in one direction with the result that the brush assembly 18 rotates in a clockwise direction against the side of the vehicle V, see FIG. 3 and FIG. 9. The closing of contacts 108 and 110, which are also ganged together, results in the rotation of the brush assembly 18 in a counterclockwise direction. In addition to the motor 68, the circuitry also determines actuation of the pump and spray assembly 22 as will now be described with particular reference to FIGS. 1, 4 and 6.

The pump and spray assembly includes pumps 120 and 122, which are disposed in the reservoir 20 and supply spray nozzles 126 and 124 respectively by means of cross over conduit lines 128 and 130 respectively. The nozzles 124 disposed on the right side of the body front wall 40 are oriented to dispose cleaning fluid directly into the brush assembly 18 when said assembly is disposed in the left hand operative position. The left hand nozzles 126 are oriented to direct cleaning fluid into the brush assembly 18 when said assembly is disposed in the right hand position. As clearly shown in the circuit diagram of FIG. 8 the closing of right contacts 104 and 106 results in the actuation of the left pump 122 to spray liquid from the right nozzles 124 and rotate the brush assembly 18 in a clockwise direction and the closing of the contacts 108 and 110 results in the actuation of the right pump 120 to spray liquid from the left nozzles 126 and rotate the brush assembly 18 in a counterclockwise direction. As best shown in FIGS. 1 and 3, a cover 128 is provided for the switching mechanism 101 said cover extending between opposite sides of the body 10 and being attached thereto in removable relation as by fasteners.

As shown generally on the circuitry schematic of FIG. 8, an on/off switch 130 is provided for complete power switch off. In addition, a charger input 132 provides a means of charging the batteries 24, while an outlet 134 provides a power supply for accessories such as handbrushes which may be used with the apparatus for cleaning the upper surfaces of the vehicle.

It is thought that the structural and functional features of this car wash apparatus have become fully apparent from the foregoing description of parts, but for completeness of disclosure the operation of the apparatus will be briefly described.

The operation of the carwash apparatus is best understood by reference to FIGS. 3 and 9. It will be assumed that the apparatus is initially in an inoperative, neutral position in which the handle assembly locking arm 90 is engaged within the center notch 100 of the notched member 94. In this condition the positive switching mechanism provided by contacts 104, 106 and 108, 110 is in a disengaged condition. It will be presumed that a vehicle V to be cleaned is on the left side of the apparatus relative to forward longitudinal movement. The handle assembly 80 is pivoted upwardly about the pivot fasteners 88 out of engagement with the center notch 100 and the support assembly 14 is swung about the pivot axis defined by pintle members 64 and 65 in a counterclockwise direction so that the locking arm 90 can be disposed within notch 96 on the right hand side of the apparatus. The result of this is that the boom 60, carrying the brush assembly 18 with it, rotates to the left side of the apparatus and contacts 104 and 106 are engaged within cooperating contacts 112 and 114. When this engagement of contacts occurs the reversible motor 68 is actuated and, by means of sprocketed shaft 72, chain 74 and sprocketed shaft 78, causes the brush assembly 80 to rotate in a clockwise direction. At the same time the left side pump 122 is actuated so that the right side spray nozzles 126 direct cleaning fluid into the brush assembly 18. The operator then circumnavigates the apparatus in a counterclockwise direction about the vehicle V. When the circumnavigation is complete the handle assembly locking arm 90 is moved to the neutral position in engagement with notch 100 thereby disengaging the switching mechanism 101. The apparatus as a whole is then rotated through one hundred eighty degrees (180°) so that it is facing in the opposite direction. The support assembly 14 is then swung in a clockwise direction so that the locking arm 90 can be moved into engagement with notch 98 with the result that switch contacts 108 and 110 become engaged with cooperating contacts 116 and 118. When this occurs the reversible motor 68 is actuated to rotate the brush assembly 18 in a counterclockwise direction. At the same time the right side pump 120 is actuated so that the left side spray nozzles 124 direct cleaning fluid into the brush assembly 18. The apparatus is then navigated about the vehicle V once more but in a clockwise direction. The vehicle V is thereby double washed which provides a superior cleaning operation.

The maintenance of the device is particularly facilitated by the ability of the operator to make only a few simple electrical disconnections before being able to remove the brush support assembly 14 as a whole from the body 10, together with the drive assembly 16 which is mounted to said support assembly. In addition, the packaging of the apparatus for transportation is facilitated by removing the cover 128, lifting the support assembly 14 from the body and rotating said support assembly, together with the attached brush assembly 14, through a half turn and replacing it in the body. The result of this is that the brush assembly 18 is received between the push arms 48 thereby rendering the apparatus as a whole more compact. The disposition of the spray nozzles 124 and 126 on the opposite side of the apparatus from the operative positions of the brush assembly 18 provides a particular advantage in that the spray pattern is enhanced because the distance from brush to nozzle is greater than if the nearer nozzle were used.

Further, the disposition of the brush assembly 18 forwardly but to one side of the body 10 during the cleaning operation, and the rotation of said brush assembly in a particular direction depending on which side of the body it is disposed on, results in a brush rotation, relative to the longitudinal direction of travel of the apparatus as a whole, which ensures that the body 10 acts as a protective spray shield for the rearwardly located operator.

This portable apparatus is exceedingly economical in both water and energy consumption. It completes a carwash operation with a water usage of 10 gallons and, because of the chargeable battery arrangement, with a relatively small electricity consumption. By contrast a conventional tunnel carwash system utilizes 100 gallons of water together with an enormous electricity consumption.

I claim as my invention:

1. In a trackless portable carwash apparatus:
   (a) a portable body means having opposed sides and including pivot mounting means disposed intermediate said sides and defining a substantially vertical pivot axis,
   (b) brush support means including a substantially horizontal boom means having a depending post means fixedly attached thereto, said post means being mounted to the body for manual swinging movement of the boom means about the pivot axis from an operating position on one side of the body to an operating position on the other side of the body,
   (c) brush means mounted to the boom means forwardly of the body for rotation about a substantially fixed axis disposed in spaced relation from the pivot axis for swinging movement with the boom means, and
   (d) drive means carried by the support means and connected in drive relation to the brush means.

2. An apparatus as defined in claim 1, in which:
   (e) the body means includes front and rear walls and oppositely disposed side walls and the pivot axis is disposed within the area defined by said walls, and
   (f) the drive means includes motor means mounted to the post means, and the boom means, fixed post means, motor means and brush means are liftably removable from the pivot mounting of the body means as a unit.

3. In a trackless portable carwash apparatus:
   (a) a portable body means having opposed sides and including pivot mounting means disposed intermediate said sides and defining a substantially vertical pivot axis,
   (b) brush support means mounted to the body for manual swinging movement about the pivot axis from an operating position on one side of the body to an operating position on the other side of the body,
   (c) brush means mounted to the support means forwardly of the body for rotation about an axis disposed in spaced relation from the pivot axis for swinging movement with the support means,
   (d) drive means carried by the support means and connected in drive relation to the brush means,
   (e) the body means being substantially hollow and including front and rear walls, and
   (f) the support including a forwardly extending boom means, a rearwardly extending handle means and a transverse post means the post means carrying at least part of the drive means and being mounted within the hollow body.

4. An apparatus as defined in claim 3, in which:
   (g) the drive means includes motor means mounted to the post means within the hollow body, and a flexible drive element housed by the boom means and operatively connecting the motor means to the brush means.

5. In a trackless portable carwash apparatus:
(a) a portable body means having opposed sides and including pivot mounting means disposed intermediate said sides and defining a substantially vertical pivot axis,
(b) brush support means mounted to the body for manual swinging movement about the pivot axis from an operating position on one side of the body to an operating position on the other side of the body,
(c) brush means mounted to the support means forwardly of the body for rotation about an axis disposed in spaced relation from the pivot axis for swinging movement with the support means,
(d) drive means carried by the support means and connected in drive relation to the brush means,
(e) the body means including a pair of ground wheels,
(f) reservoir means being provided carried by the body means,
(g) discharge means supplying liquid from the reservoir means to the brush means,
(h) the reservoir means including a center of gravity disposed in substantially vertically aligned relation above the axis of rotation of the ground wheels, and
(i) power means being provided including battery means carried by the body and disposed rearwardly of the reservoir means relative to the ground wheels in counterbalance relation to the brush means.

6. In a portable carwash apparatus:
(a) a portable body means having opposed sides and including pivot mounting means defining a pivot axis,
(b) brush support means mounted to the body for swinging movement about the pivot axis from an operating position on one side of the body to an operating position on the other side of the body,
(c) brush means mounted to the support means for rotation about an axis disposed in spaced relation from the pivot axis for swinging movement with the support means,
(d) drive means carried by the support means and connected in drive relation to the brush means,
(e) reservoir means carried by the body means,
(f) discharge means including spray means carried on each side of the body means and pump means selectively delivering liquid from the reservoir means to the spray means, said pump means delivering liquid to the brush means from the spray means on one side of the body means when said brush means is disposed on the other side of the body means the increased distance between said spray means and said brush means tending to enhance the spray pattern.

7. In a trackless portable carwash apparatus:
(a) portable body means having opposed sides and including pivot mounting means disposed intermediate said sides and defining a substantially vertical pivot axis,
(b) brush support means mounted to the body for manual swinging movement about the pivot axis from an of the body for rotation about an axis disposed in spaced relation from the pivot axis for swinging movement with the support means,
(d) drive means carried by the support means and connected in drive relation to the brush means,
(e) the drive means including reversible electric motor means, and
(f) power means being provided including automatic switching means selectively supplying power to drive the motor means in one direction when the brush means is on one side of the body means and to drive the motor means in the other direction when the brush means is on the other side of the body means, said directional reversal of the brush means occuring after movement of the brush means from one side to the other side has commenced.

8. In a portable carwash apparatus:
(a) a portable body means having opposed sides and including pivot mounting means defining a pivot axis,
(b) brush support means mounted to the body for swinging movement about the pivot axis from an operating position on one side of the body to an operating position on the other side of the body,
(c) brush means mounted to the support means for rotation about an axis disposed in spaced relation from the pivot axis for swinging movement with the support means,
(d) drive means carried by the support means and connected in drive relation to the brush means,
(e) reservoir means carried by the body means,
(f) discharge means including spary means carried by the body means and pump means selectively delivering liquid from the reservoir means to the spray means,
(g) the spray means including spray nozzles disposed on each side of the body means,
(h) the pump means including first and second pumps one pump being associated with the spray nozzles on one side of the body means and the other pump being associated with the spray nozzles on the other side of the body means,
(i) the drive means including a reversible electric motor means, and
(j) power means being provided including switching means actuating one of the pumps and driving the motor means in one direction when the brush means is on one side of the body means, and actuating the other of the pumps and driving the motor means in the other direction when the brush means is on the other side of the body means.

9. In a trackless portable carwash apparatus:
(a) a portable body means having opposed sides and including pivot mounting means disposed intermediate said sides and defining a substantially vertical pivot axis,
(b) brush support means mounted to the body for manual swinging movement about the pivot axis from an operating position on one side of the body to an operating position on the other side of the body,
(c) brush means mounted to the support means forwardly
(c) brush means mounted to the support means forwardly of the body for rotation about an axis disposed in spaced relation from the pivot axis for swinging movement with the support means,
(d) drive means carried by the support means and connected in drive relation to the brush means, (e) the support means including a single upper boom means and a post means depending from said boom means,
(f) the brush means being mounted in depending relation at one end of the boom means,
(g) the drive means including motor means mounted to the post means and housed within the body means and a flexible drive element housed by the boom means and operatively connecting the motor means to the brush means, and
(h) the support means, drive means and brush means being removably liftable as a unit from the body means.

10. In a portable carwash apparatus:
(a) a portable body means having opposed sides and including pivot mounting means defining a pivot axis,
(b) brush support means mounted to the body for swinging movement about the pivot axis from an operating position on one side of the body to an operating position on the other side of the body,
(c) brush means mounted to the support means for rotation about an axis disposed in spaced relation from the pivot axis for swinging movement with the support means,
(d) drive means carried by the support means and connected in drive relation to the brush means,
(e) the drive means including reversible electric motor means, and
(f) power means being provided including automatic switching means selectively supplying power to drive the motor means in one direction when the brush means is on one side of the body means and to drive the motor means in the other direction when the brush means is on the other side of the body means,
(g) the switching means including a pair of movable contact means, mounted to the support means for movement with said support means, and associated fixed contact means selectively engageable by said movable contact means to selectively supply power to said reversible motor means.

11. In a portable carwash apparatus:
(a) a portable body means having opposed sides and including pivot mounting means defining a pivot axis,
(b) brush support means mounted to the body for swinging movement about the pivot axis from an operating position on one side of the body to an operating position on the other side of the body,
(c) brush means mounted to the support means for rotation about an axis disposed in spaced relation from the pivot axis for swinging movement with the support means,
(d) drive means carried by the support means and connected in drive relation to the brush means,
(e) the support means including a boom means, a post means and a handle means pivotally mounted to one of said means,
(f) the brush means being mounted in depending relation to the end of the boom means, and
(g) the body means including spaced detent means selectively engageable by the pivoted handle means to hold the boom means in the operative positions.

12. In a trackless portable carwash apparatus:
(a) a portable body means having opposed sides and including pivot mounting means disposed intermediate said sides and defining a substantially vertical pivot axis,
(b) brush support means mounted to the body for manual swinging movement about the pivot axis from an operating position on one side of the body to an operating position on the other side of the body, operating position on one side of the body to an operating position on the other side of the body,
(c) brush means mounted to the support means forwardly of the body for rotation about an axis disposed in spaced relation from the pivot axis for swinging movement with the support means,
(d) drive means carried by the support means and connected in drive relation to the brush means,
(e) the drive means including reversible means selectively reversing the direction of rotation of the brush means when the brush means is disposed on one side of the body means from the direction of rotation of the brush means when said brush means is disposed on the other side of the body means said directional reversal of the brush means occuring after movement of the brush means from one side to the other side has commenced.

13. In a portable carwash apparatus:
(a) a portable body means having opposed sides and including pivot mounting means defining a pivot axis,
(b) brush support means mounted to the body for swinging movement about the pivot axis from an operating position on one side of the body to an operating position on the other side of the body,
(c) brush means mounted to the support means for rotation about an axis disposed in spaced relation from the pivot axis for swinging movement with the support means,
(d) drive means carried by the support means and connected in drive relation to the brush means,
(e) the support means including a boom means and a post means,
(f) the brush means being mounted in depending relation at one end of the boom means,
(g) the drive means including motor means mounted to the post means and a flexible drive element housed by the boom means and operatively connecting the motor means to the brush means,
(h) the support means, drive means and brush means being removably liftable as a unit from the body means, and
(i) the body means including front and rear walls, and the pivot mounting means being disposed closer to the front wall than to the rear wall, and
(j) the support means, drive means and brush means unit being reversibly mountable on the body means for transportation and storage the boom means extending rearwardly a lesser distance in the reversibly mounted condition than in the operative condition.

14. In a portable carwash apparatus:
(a) a body means having opposed sides and spaced ground wheel means and including pivot mounting means defining a substantially vertical pivot axis,
(b) brush support means including a forwardly extending boom means, a rearwardly extending handle means and depending post means, said support means being pivotally mounted to the body means for swinging movement of the boom means by the handle means from an operating position on one side of the body means to an operating position on the other side of the body means,
(c) brush means mounted in depending relation to the boom means for rotation about a substantially vertical axis disposed in spaced relation from the pivot axis,
(d) drive means carried by the support means and including a reversible motor means and a flexible drive element operatively connecting the motor means in drive relation to the brush means,
(e) reservoir means carried by the body means,
(f) discharge means supplying liquid from the reservoir means to the brush means including spray means mounted at each side of the body means and pump means selectively pumping liquid to the spray means on one side of the body when the brush means is disposed on the other side of the body, and
(g) power means for the drive means and the pump means including battery means carried by the body means and disposed in counterbalance relation to the brush means said power means including switching means selectively actuating the pump means to supply one of said spray means and drive the motor means in one direction when the brush means is on one side of the body means, and actuating the pump means to supply the other of said spray means and driving the motor means in the other direction when the brush means is on the other side of the body means.

* * * * *

UNITED STATES PATENT OFFICE
CERTIFICATE OF CORRECTION

Patent No. 4,135,270  Dated January 23, 1979

Inventor(s) Earl L. Miner

It is certified that error appears in the above-identified patent and that said Letters Patent are hereby corrected as shown below:

<u>Claim 7, Column 7</u>:

Line 66 between "an" and "of" insert -- operating position on one side of the body to an operating position on the other side of the body, (c) brush means mounted to the support means forwardly

UNITED STATES PATENT OFFICE
CERTIFICATE OF CORRECTION

Patent No. 4,135,270          Dated January 23, 1979

Inventor(s) Earl L. Miner

It is certified that error appears in the above-identified patent and that said Letters Patent are hereby corrected as shown below:

Claim 7, Column 8:

Line 3 after "reversible" cancel --electric-- ; and

Lines 4-13 cancel in their entirety, and substitute --means selectively reversing the direction of rotation of the brush means when the brush means is disposed on one side of the body means from the direction of rotation of the brush means when said brush means is disposed on the other side of the body means said directional reversal of the brush means occuring after movement of the brush means from one side to the other side has commenced.--

UNITED STATES PATENT OFFICE
CERTIFICATE OF CORRECTION

Patent No. 4,135,270　　　　　　Dated January 23, 1979

Inventor(s) Earl L. Miner

It is certified that error appears in the above-identified patent and that said Letters Patent are hereby corrected as shown below:

Claim 8, Column 8:

Line 29 between "including" and "means" cancel "spary" and insert --spray--

Claim 9, Column 8:

Lines 59 and 60 cancel in their entirety

UNITED STATES PATENT OFFICE
CERTIFICATE OF CORRECTION

Patent No. 4,135,270    Dated January 23, 1979

Inventor(s)   Earl L. Miner

It is certified that error appears in the above-identified patent and that said Letters Patent are hereby corrected as shown below:

Claim 9, Column 9:

Lines 1-13 cancel in their entirety and substitute -- (e) the drive means including reversible electric motor means, and (f) power means being provided including automatic switching means selectively supplying power to drive the motor means in one direction when the brush means is on one side of the body means and to drive the motor means in the other direction when the brush means is on the other side of the body means, said directional reversal of the brush means occuring after movement of the brush from one side to the side has commenced.

UNITED STATES PATENT OFFICE
CERTIFICATE OF CORRECTION

Patent No. 4,135,270    Dated   January 23, 1979

Inventor(s)   Earl L. Miner

It is certified that error appears in the above-identified patent and that said Letters Patent are hereby corrected as shown below:

Claim 12, Column 10:

Line 7 after "," cancel --operating position on one side of the body to an operating position on the other side of the body,--
Line 8 cancel in its entirety Lines 15-23 cancel in their entirety and substitute --(e) the support means including a single upper boom means and a post means depending from said boom means, (f) the brush means being mounted in depending relation at one side of the boom means, (g) the drive means including motor means mounted to the post means and housed within the body means and a flexible drive element housed by the boom means and operatively connecting the motor means to the brush means, and (h) the support means, drive means and brush means being removably liftable as a unit from the body means.

Signed and Sealed this

Thirty-first Day of July 1979

[SEAL]

Attest:

Attesting Officer

LUTRELLE F. PARKER
Acting Commissioner of Patents and Trademarks